United States Patent [19]

Ray

[11] 4,095,365
[45] Jun. 20, 1978

[54] BAIT BUCKET

[76] Inventor: Otis Eugene Ray, 6850-66th St., North, Pinellas Park, Fla. 33565

[21] Appl. No.: 760,710

[22] Filed: Jan. 19, 1977

[51] Int. Cl.² ............................................ A01K 97/04
[52] U.S. Cl. ....................................... 43/55; 206/805; 220/339
[58] Field of Search ................ 43/54.5 A, 54.5 R, 55, 43/56, 57.5 R; 206/515, 805; 150/43; 220/337, 339, 341, 346, DIG. 14; 229/46

[56] References Cited

U.S. PATENT DOCUMENTS

| | | | |
|---|---|---|---|
| 2,663,533 | 12/1953 | Keiser et al. | 43/55 |
| 3,009,281 | 11/1961 | Unger | 43/56 |
| 3,784,040 | 1/1974 | Douglas | 215/1 C |

FOREIGN PATENT DOCUMENTS

| | | | |
|---|---|---|---|
| 1,807,546 | 9/1969 | Germany | 220/31.5 |
| 67,170 | 12/1943 | Norway | 206/805 |

*Primary Examiner*—Louis G. Mancene
*Assistant Examiner*—Robert P. Swiatek
*Attorney, Agent, or Firm*—B. P. Fishburne, Jr.

[57] ABSTRACT

A one piece, all plastic bait bucket or container is adapted to be manufactured at minimum cost by blow molding techniques. The lightweight and durable bucket for live bait has a side wall door which is integrally hinged to the body of the bucket and may be held normally closed by an elastic band arrangement. The tapered shape of the bucket facilitates towing through water and enables a greater separation of the live bait in the bucket to keep the bait alive longer.

1 Claim, 6 Drawing Figures

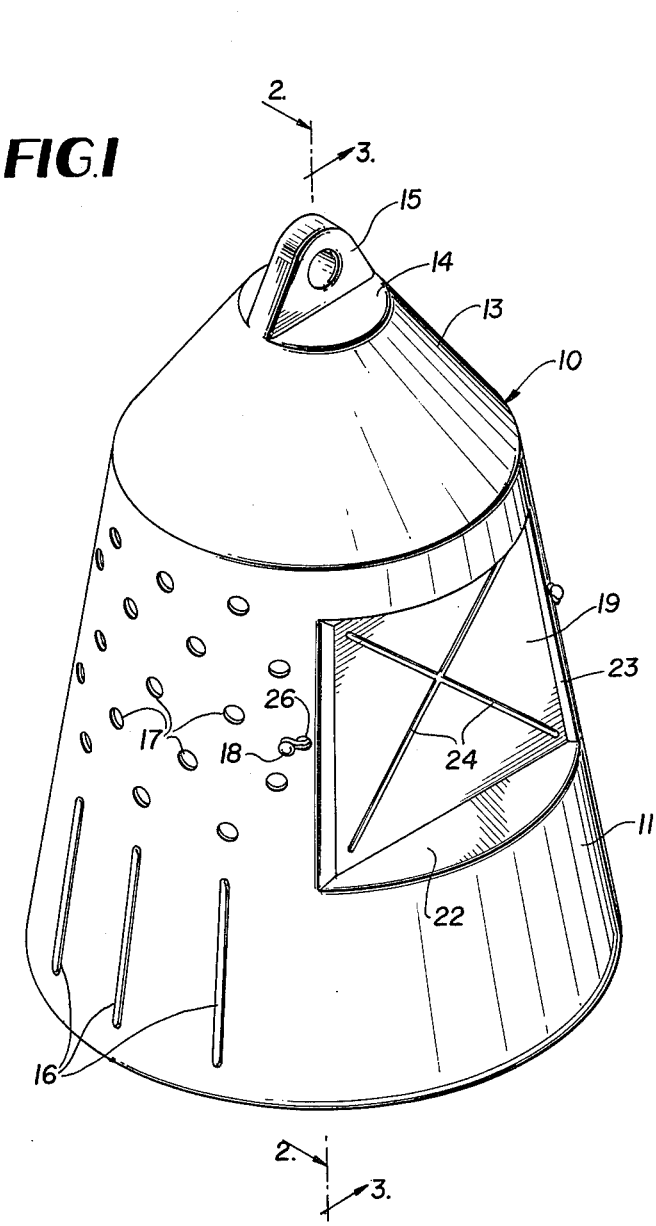
FIG.1
FIG.4
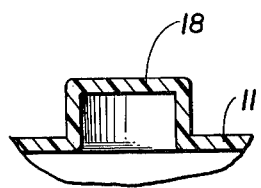
FIG.5
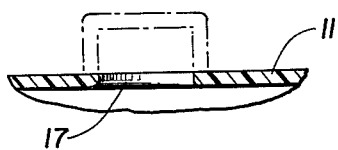
FIG.6

BAIT BUCKET

BACKGROUND OF THE INVENTION

Buckets and containers for live bait are well known in the prior art and generally fall into two categories. The first category is a simple cylindrical bucket with a slip-on top and quite inexpensive, but very inefficient and unsatisfactory as a live bait container. The second category involves live bait containers which are quite sophisticated in design and formed of a number of parts which must be fabricated into an assembly, and while quite efficient are prohibitively costly for many fishermen.

Therefore, the objective of this invention is to provide a very inexpensive bait bucket or container which is also efficient and provides most, if not all, of the desirable features present in much more expensive containers.

Some examples of the patented prior art appear in U.S. Pat. Nos. 2,842,890; 3,009,281; 3,203,134 and 3,728,812.

SUMMARY OF THE INVENTION

In accordance with the invention, a thin walled lightweight live bait container of one piece construction is formed of plastics material by inexpensive blow molding procedures. The product in terms of its method of manufacture is similar to plastic jugs used for bulk milk and beverages which are so inexpensive that they may be discarded after a single use. The bait bucket thus produced has an integral towing eye at one end, a cylindrically tapered body and a broad circular end wall remote from the towing eye to allow the greatest separation of live bait. The side wall of the container is apertured to allow the inflow and outflow of water. A convenient side wall access door is formed by severing a molded flat panel along three sides and leaving one side joined to the container body by an integral or "living" hinge. The door can be maintained closed by the action of a rubber band spanning its interior side with ends looped about external projections on the container and passing through apertures near opposite sides of the door. Stiffening ribs are provided at appropriate points on the container and door in the molding procedure.

BRIEF DESCRIPTION OF THE DRAWINGS

FIG. 1 is a perspective view of a live bait container embodying the invention.

FIG. 4 is an enlarged fragmentary horizontal section taken on line 4—4 of FIG. 3.

FIG. 5 is a fragmentary cross sectional view of a molded projection on the container.

FIG. 6 is a similar view depicting the removal of this projection to produce an aperture in the container wall.

DETAILED DESCRIPTION

Figure 3:
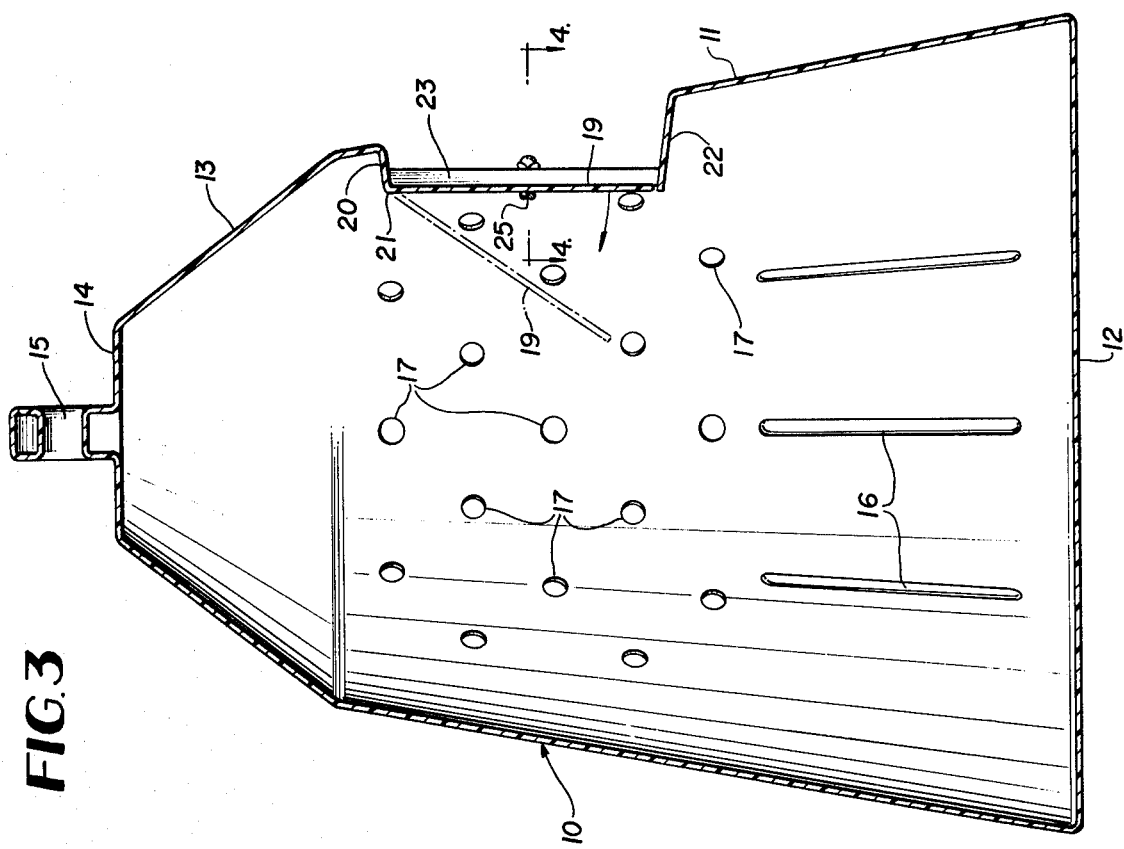
FIG. 3 is a similar section taken on line 3—3 of FIG. 1.
Figure 2:
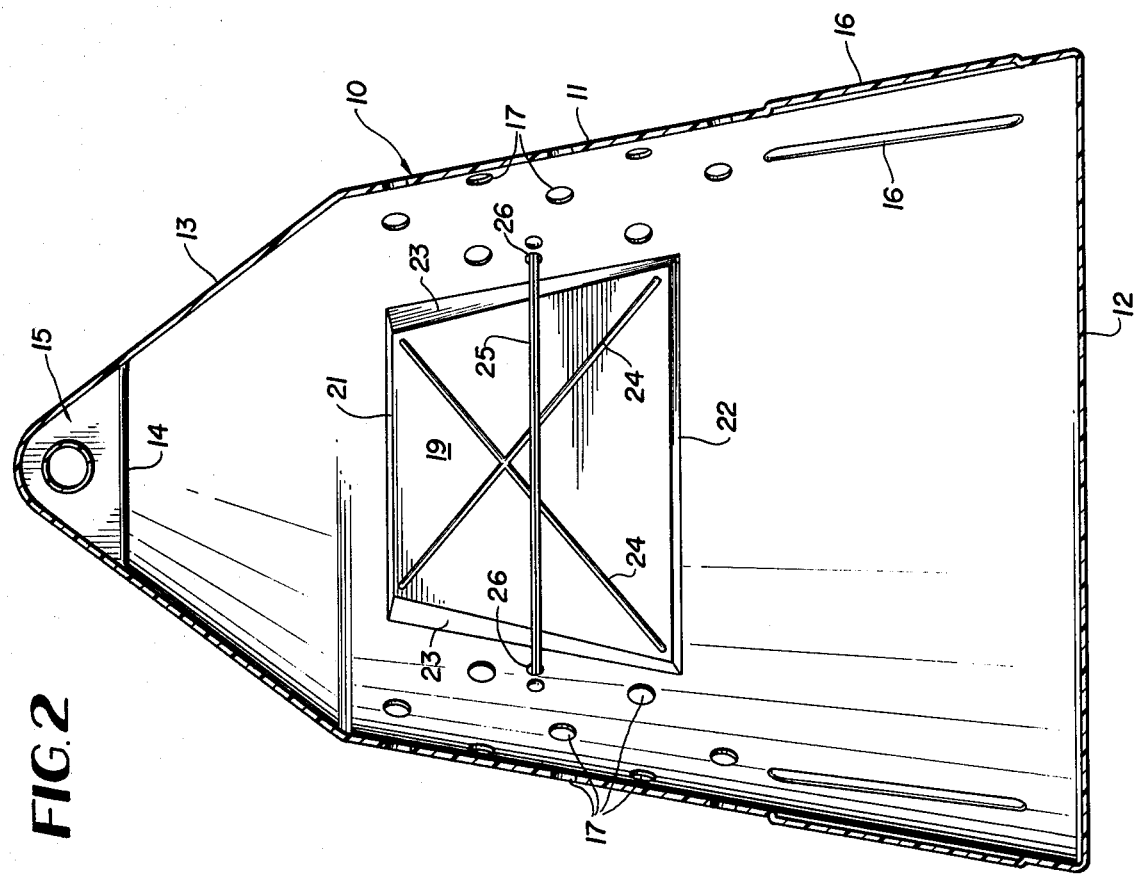
FIG. 2 is a central vertical section taken on line 2—2 of FIG. 1.

Referring to the drawings in detail, wherein like numerals designate like parts, a live bait bucket or container 10 is formed in one piece from plastics material by blow molding. As is well known, the resulting product can have a quite thin uniform wall thickness and is therefore lightweight while retaining considerable toughness and durability. The product produced by blow molding is very inexpensive.

More particularly, the one piece bait container 10 has a conically tapered side wall 11 joined to a broad flat circular bottom or end wall 12 which imparts stability to the container in an upright position and promotes a wider separation of live bait in the container for the purpose of keeping the bait alive longer. The opposite end portion 13 of the one piece container is more steeply conically tapered than the longer side wall 11 and terminates in a narrow flat end face 14 having a hollow towing eye 15 integrally joined therewith as best shown in FIG. 3.

The lower portion of the container side wall 11 is preferably provided with a plurality of circumferentially spaced longitudinal stiffening ribs 16 of shallow construction. Above these ribs, the container side wall has a multiplicity of uniformly spaced apertures 17 through which water may flow into and out of the container. The number and precise size of these apertures may be varied somewhat in the invention depending on the size of the container and other factors.

As depicted in FIGS. 5 and 6, the apertures 17 may be produced in the blow molding procedure by forming external hollow projections 18 on the container side wall and subsequently cutting off these projections, FIG. 6, to form the apertures 17.

An important feature of the invention is the provision of a side wall access door or flap 19 on the container which is initially molded as an integral flat recessed panel and subsequently severed along its two sides and lower edge to produce the door or flap 19. The upper end of the door 19 is unsevered and remains integrally joined with a recessed ledge 20 of the container to provide the door with a living hinge 21. As best shown in FIG. 3, the door 19 is pushed inwardly to open it and swings on the axis of the living hinge 21 relative to a lower molded ledge 22 formed on the container in the molding procedure. As shown in FIGS. 1 and 3, the door 19 is recessed or inset between the upper and lower ledges 20 and 22. Relatively narrow side flanges 23, FIG. 4, are also formed on opposite sides of the integrally hinged door 19.

To increase its rigidity, the door 19 is preferably provided with crossing ribs 24 in the molding process.

In order to stabilize the door 19 in the closed position, a conventional elastic band 25 may be utilized. This band extends horizontally across the interior side of the door 19 near the vertical center of the door and passes through a pair of apertures 26 in the container side wall. The ends of the elastic band are then looped over a pair of the projections 18 on the side wall 11. The construction provides an efficient and highly inexpensive closure means for the one piece blow molded bait bucket or container.

The tapered configuration of the bucket allows it to be towed easily through the water behind a boat. The device will float in the water and does not have to be weighted on one side, as it is of no concern whether the door 19 is on top of or under the water while floating. No metal parts are employed and no costly assembling operations are required as the device is essentially one piece. Costly injection molding is avoided.

Prior to cutting off the projections 18 to form the apertures, and prior to cutting around three sides of the door 19, the container is closed and could serve as a jug for various liquids after the provision of a conventional filler opening and cap, not shown. The advantages of the device over the prior art types should now be apparent.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A container for live bait formed as a unit by blow molding, said container having a conically tapered body which is apertured in its side wall and which includes a comparatively wide flat end wall and a towing eye at its end remote from said end wall, a side wall closure for said container in the form of a substantially flat panel which is integrally hinged to the container side wall on a hinge axis substantially transverse to the longitudinal axis of the container and with the free end of the panel away from the integral hinge and disposed nearest said end wall, a pair of spaced projections on the container side wall on opposite sides of said closure panel, said container side wall having a pair of apertures on opposite sides of said closure panel and between the closure panel and said projections, and an elastic band looped over said projections and anchored thereby and extending through said pair of apertures and across the interior side of the closure panel chordwise of said side wall and being taut to resist inward swinging of the closure panel about the axis of the integral hinge and yielding to permit such inward swinging when bait is introduced into the container and then returning the closure panel automatically to a closed position, said closure panel when closed lying within an opening of said side wall which is inset from the peripheral surface of the side wall to thereby extend chordwise of said side wall.

* * * * *